United States Patent
Park et al.

(10) Patent No.: US 9,235,074 B2
(45) Date of Patent: Jan. 12, 2016

(54) DISPLAY DEVICE AND MANUFACTURING METHOD THEREOF

(71) Applicant: Samsung Display Co., Ltd., Yongin, Gyeonggi-Do (KR)

(72) Inventors: Hong Sick Park, Suwon-si (KR); Seon-Il Kim, Seoul (KR); Min Ho Moon, Anyang-si (KR); Hyang-Shik Kong, Seongnam-si (KR); Yeun Tae Kim, Suwon-si (KR); Chang Oh Jeong, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 120 days.

(21) Appl. No.: 13/961,793

(22) Filed: Aug. 7, 2013

(65) Prior Publication Data
US 2014/0204300 A1    Jul. 24, 2014

(30) Foreign Application Priority Data
Jan. 23, 2013    (KR) ........................ 10-2013-0007483

(51) Int. Cl.
*G02F 1/1333*    (2006.01)
*G02F 1/1341*    (2006.01)
*G02F 1/1345*    (2006.01)

(52) U.S. Cl.
CPC ........ *G02F 1/133377* (2013.01); *G02F 1/1341* (2013.01); *G02F 1/13458* (2013.01); *G02F 1/133305* (2013.01)

(58) Field of Classification Search
CPC .......... G02F 1/133377; G02F 1/13458; G02F 1/133305; G02F 1/1341
See application file for complete search history.

(56) References Cited

U.S. PATENT DOCUMENTS

| 6,141,072 A | 10/2000 | Drabik et al. |
| 6,400,430 B2 | 6/2002 | Nakao et al. |
| 6,747,800 B1 | 6/2004 | Lin |
| 7,420,728 B2 | 9/2008 | Tung et al. |
| 2005/0041191 A1* | 2/2005 | Lim ............................. 349/152 |
| 2006/0019482 A1* | 1/2006 | Su et al. ........................ 438/618 |
| 2006/0264065 A1* | 11/2006 | So et al. ........................ 438/781 |
| 2008/0038518 A1* | 2/2008 | Gallagher et al. ............ 428/174 |
| 2008/0311690 A1* | 12/2008 | Tu et al. ......................... 438/29 |
| 2009/0195855 A1* | 8/2009 | Steyn et al. ................... 359/290 |

(Continued)

FOREIGN PATENT DOCUMENTS

| JP | 4893431 | 1/2012 |
| KR | 10-2003-0063656 A | 7/2003 |
| KR | 1020140025739 A | 3/2014 |

*Primary Examiner* — Dennis Y Kim
(74) *Attorney, Agent, or Firm* — Innovation Counsel LLP

(57) ABSTRACT

The present invention relates to a display device and a manufacturing method thereof, wherein a spoilage layer generated in a manufacturing process is removed, and a manufacturing method of a display device according to an exemplary embodiment of the present invention includes: forming a thin film transistor on a substrate including a plurality of pixel areas; forming a pixel electrode connected to the thin film transistor in the pixel area; forming a sacrificial layer on the pixel electrode; forming a barrier layer on the sacrificial layer; forming a common electrode on the barrier layer; forming a roof layer on the common electrode; patterning the barrier layer, the common electrode, and the roof layer to exposed a portion of the sacrificial layer thereby forming an injection hole; removing the sacrificial layer to form a microcavity for a plurality of pixel areas; removing the barrier layer.

13 Claims, 22 Drawing Sheets

(56) References Cited

U.S. PATENT DOCUMENTS

| | | | |
|---|---|---|---|
| 2011/0175093 A1* | 7/2011 | Liou et al. | 257/59 |
| 2012/0062448 A1* | 3/2012 | Kim et al. | 345/55 |
| 2014/0098333 A1* | 4/2014 | Kim et al. | 349/106 |
| 2014/0104533 A1* | 4/2014 | Lee et al. | 349/46 |
| 2014/0152948 A1 | 6/2014 | Chae et al. | |

\* cited by examiner

DISPLAY DEVICE AND MANUFACTURING METHOD THEREOF

CROSS-REFERENCE TO RELATED APPLICATION

This application claims priority to and the benefit of Korean Patent Application No. 10-2013-0007483 filed in the Korean Intellectual Property Office on Jan. 23, 2013, the entire contents of which are incorporated herein by reference.

BACKGROUND (a) Field

The present invention relates to a display device and a manufacturing method thereof. More particularly, the present invention relates to a display device and a manufacturing method thereof in which a spoilage layer generated in a manufacturing process is removed.

(b) Description of the Related Art

Liquid crystal displays are a type of flat panel display that is widely used. A liquid crystal display includes two display panels on which field generating electrodes, such as a pixel electrode and a common electrode, are formed, and a liquid crystal layer interposed therebetween. An electric field is generated across the liquid crystal layer by applying a voltage to the field generating electrodes. The electric field alters the directions the liquid crystal molecules in the liquid crystal layer are aligned, which is used to control the polarization of incident light, thereby displaying an image.

The two display panels forming the liquid crystal display may be a thin film transistor array panel and an opposing display panel. In the thin film transistor array panel, a gate line transmitting a gate signal and a data line transmitting a data signal are formed, and a thin film transistor connected to the gate line and the data line and a pixel electrode connected to the thin film transistor may be formed. The opposing display panel may include a light blocking member, a color filter, a common electrode, etc. If necessary, the light blocking member, the color filter, and the common electrode may be formed in the thin film transistor array panel.

In conventional liquid crystal displays, however, two substrates are inevitably required, and the constituent elements are respectively formed on the two substrates such that the display device is heavy, the cost is high, and the processing time is long.

The above information disclosed in this Background section is only for enhancement of understanding of the background of the disclosure and therefore it may contain information that does not form the prior art that is already known to a person of ordinary skill in the art.

SUMMARY

A display device and manufacturing method thereof are provided, the display device having reduced weight, thickness, cost, and processing time, by manufacturing the display device by using one substrate.

Also, a display device with a spoilage layer generated in a process removed and a manufacturing method thereof are provided.

A manufacturing method of a display device includes: forming a thin film transistor on a substrate including a plurality of pixel areas; forming a pixel electrode connected to the thin film transistor in the pixel area; forming a sacrificial layer on the pixel electrode; forming a barrier layer on the sacrificial layer; forming a common electrode on the barrier layer; forming a roof layer on the common electrode; patterning the barrier layer, the common electrode, and the sacrificial layer to expose a remaining portion of the sacrificial layer under the roof layer, thereby forming an injection hole; removing the remaining portion of the sacrificial layer to form a microcavity for a plurality of pixel areas; removing the barrier layer; injecting a liquid crystal into the microcavity through the injection hole; and forming an encapsulation layer on the roof layer to seal the microcavity.

The barrier layer may be made of a material having a different etching rate from the common electrode, The barrier layer may be made of a material having a faster etching rate than the common electrode.

The barrier layer may be made of one of zinc-aluminum oxide (ZAO), gallium-zinc oxide (GZO), and copper.

The common electrode may be made of indium-zinc oxide (IZO).

The barrier layer may be formed with a thinner thickness than the common electrode.

The thickness of the barrier layer may be 50 Å or more.

The sacrificial layer may be made of a photosensitive organic material, and in removing the sacrificial layer, a developer may be supplied through the injection hole to remove the sacrificial layer.

In removing the barrier layer, an etchant may be supplied through the injection hole to remove the barrier layer.

The sacrificial layer may be formed with the same pattern as the barrier layer.

The manufacturing method of the display device may further include: forming a gate line and a gate pad connected to the gate line on the substrate; forming a gate insulating layer on the gate line and the gate pad; forming a data line and a data pad connected to the data line on the gate insulating layer; and forming a passivation layer on the data line and the data pad, wherein a portion of the thin film transistor may be connected to the gate line and another portion of the thin film transistor may be connected to the data line.

The manufacturing method of the display device may further include: patterning the passivation layer and the gate insulating layer to remove at least a portion of the gate insulating layer and the passivation layer positioned on the gate pad and at least a portion of the passivation layer positioned on the data pad, wherein in forming the pixel electrode, a first assistance gate pad may be formed on the gate pad and a first assistance data pad may be formed on the data pad, and the first assistance gate pad and the second assistance data pad may be formed with the same material as the pixel electrode.

The manufacturing method of the display device may further include: patterning the sacrificial layer to remove the sacrificial layer positioned on the first assistance gate pad and the first assistance data pad, and in forming the barrier layer, a second assistance gate pad may be formed on the first assistance gate pad and a second assistance data pad may be formed on the first assistance data pad, and the second assistance gate pad and the second assistance data pad may be formed with the same material as the barrier layer.

In forming the common electrode, a third assistance gate pad may be formed on the second assistance gate pad and a third assistance data pad may be formed on the second assistance data pad, and the third assistance gate pad and the third assistance data pad may be formed with the same material as the common electrode.

A display device includes: a substrate including a plurality of pixel areas; a gate line and a gate pad connected to the gate line formed on the substrate; a gate insulating layer formed on the gate line and the gate pad; a data line and a data pad connected to the data line formed on the gate insulating layer;

a thin film transistor connected to the gate line and the data line; a pixel electrode connected to the thin film transistor and formed in the pixel area; a common electrode formed on the pixel electrode to be separated from the pixel electrode via a microcavity; a roof layer formed on the common electrode; an injection hole exposing a portion of the microcavity and formed in the common electrode and the roof layer; a liquid crystal filling the microcavity; an encapsulation layer formed on the roof layer to cover the injection hole and sealing the microcavity; a first assistance gate pad, a second assistance gate pad, and a third assistance gate pad sequentially formed on the gate pad; and a first assistance data pad, a second assistance data pad, and a third assistance data pad sequentially formed on the data pad.

The second assistance gate pad may be made of a material having a different etching rate from the third assistance gate pad, and the second assistance data pad may be made of a material having a different etching rate from the third assistance data pad.

The first assistance gate pad and the first assistance data pad may be formed with the same material as the pixel electrode, and the third assistance gate pad and the third assistance data pad may be formed with the same material as the common electrode.

The second assistance gate pad and the second assistance data pad may be made of a material having a faster etching rate than the common electrode.

The second assistance gate pad and the second assistance data pad may be formed of one of zinc-aluminum oxide (ZAO), gallium-zinc oxide (GZO), and copper, and the common electrode may be made of indium-zinc oxide (IZO).

The second assistance gate pad and the second assistance data pad may be formed with a thinner thickness than the common electrode, and may have a thickness of 50 Å or more.

The display device and the manufacturing method thereof use one substrate such that the weight, thickness, cost, and process time may be reduced.

Also, by removing the barrier layer after forming the barrier layer on the sacrificial layer and removing the sacrificial layer, a spoilage layer generated due to a change of the sacrificial layer may be easily removed.

DETAILED DESCRIPTION OF THE EMBODIMENTS

Figure 1:
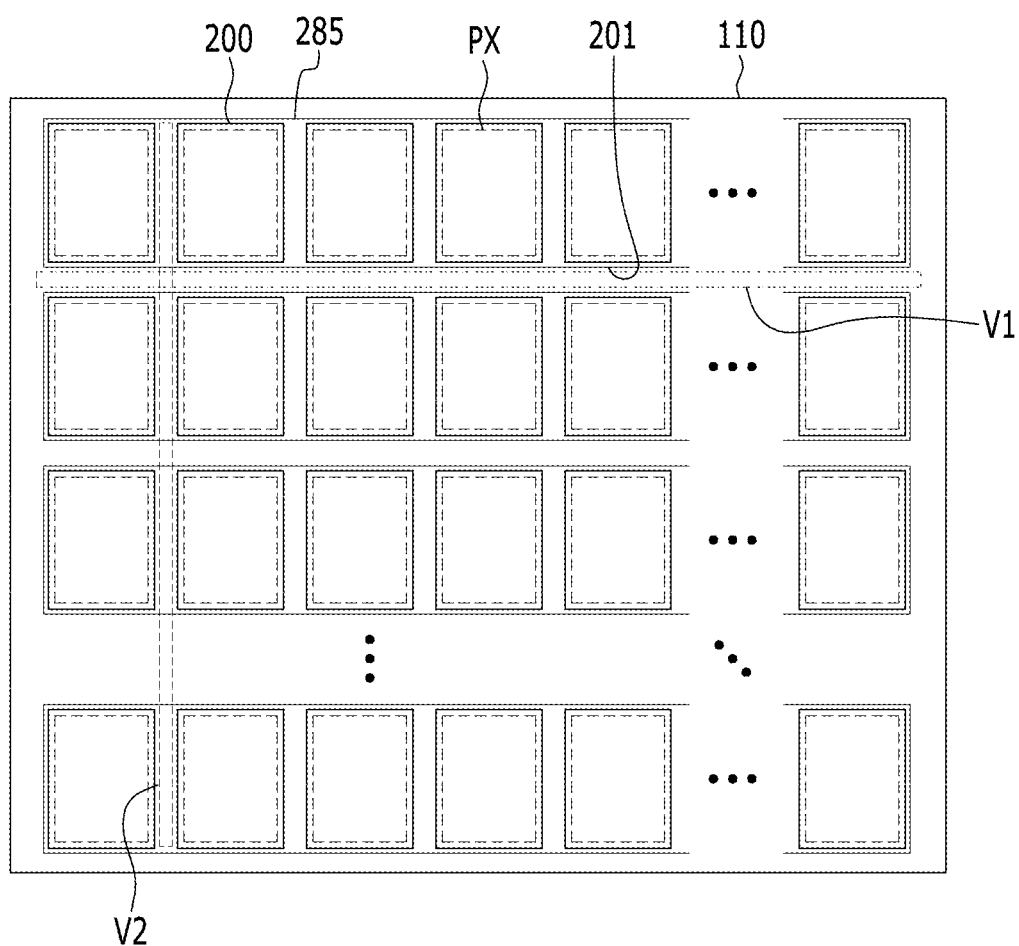
FIG. 1 is a top plan view of a display device according to an exemplary embodiment.

Example embodiments will be described more fully hereinafter with reference to the accompanying drawings. As those of ordinary skill in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Firstly, a display device according to an exemplary embodiment will be described with reference to FIG. 1 to FIG. 4.

Figure 2:
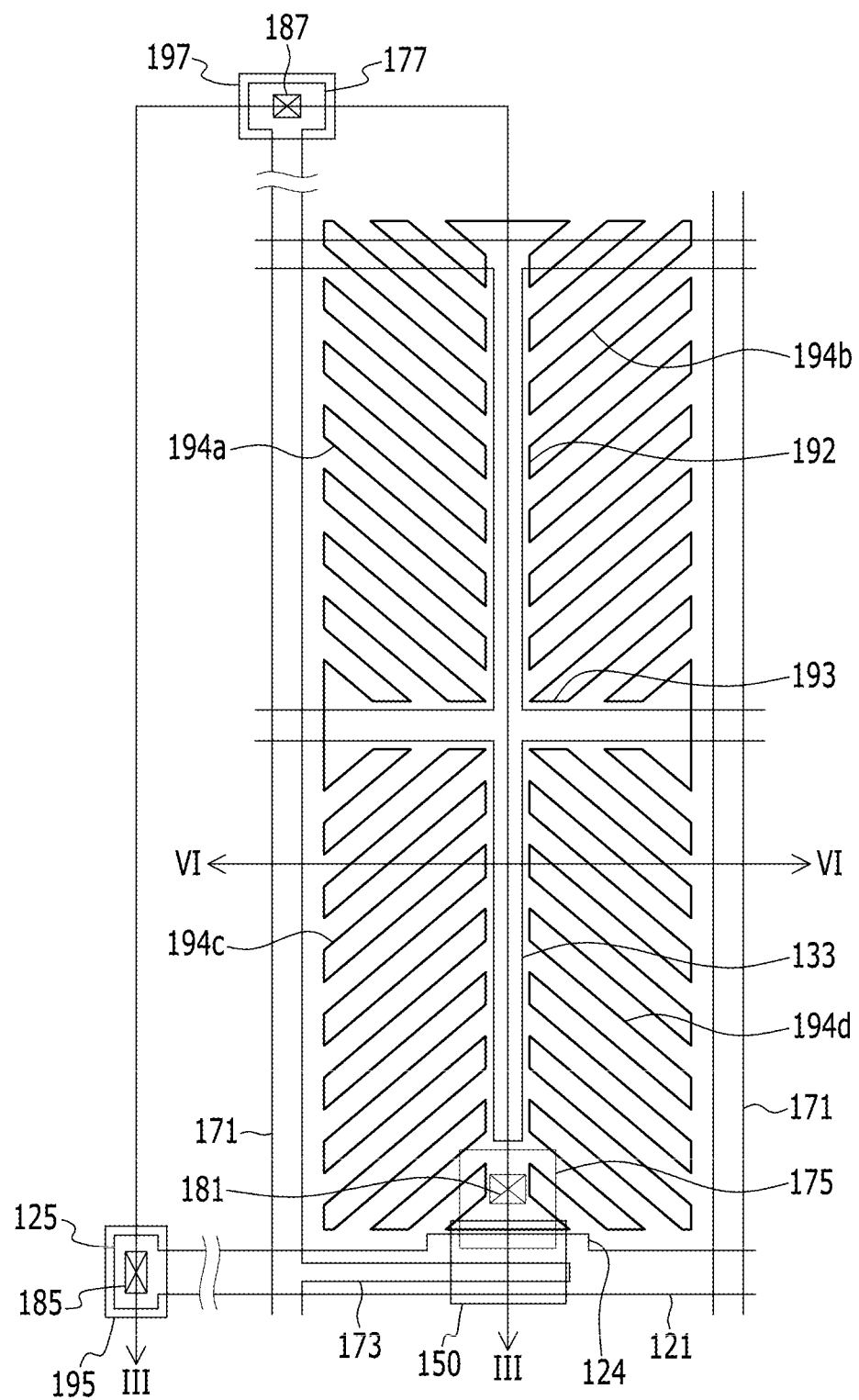
FIG. 2 is a top plan view of one pixel of a display device according to an exemplary embodiment.
Figure 3:
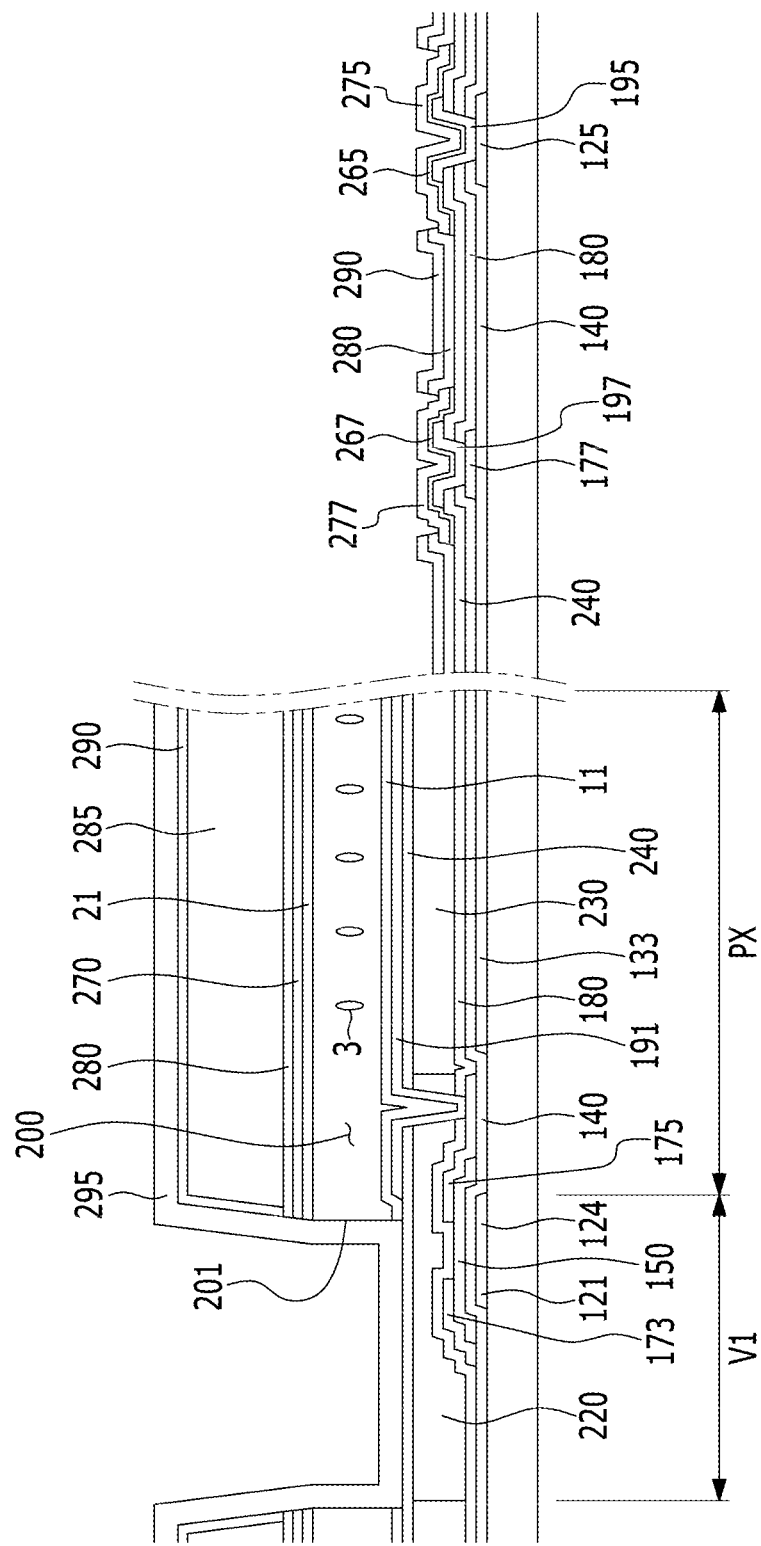
FIG. 3 is a cross-sectional view of a part of a display device according to an exemplary embodiment taken along the line III-III of FIG. 2.
Figure 4:
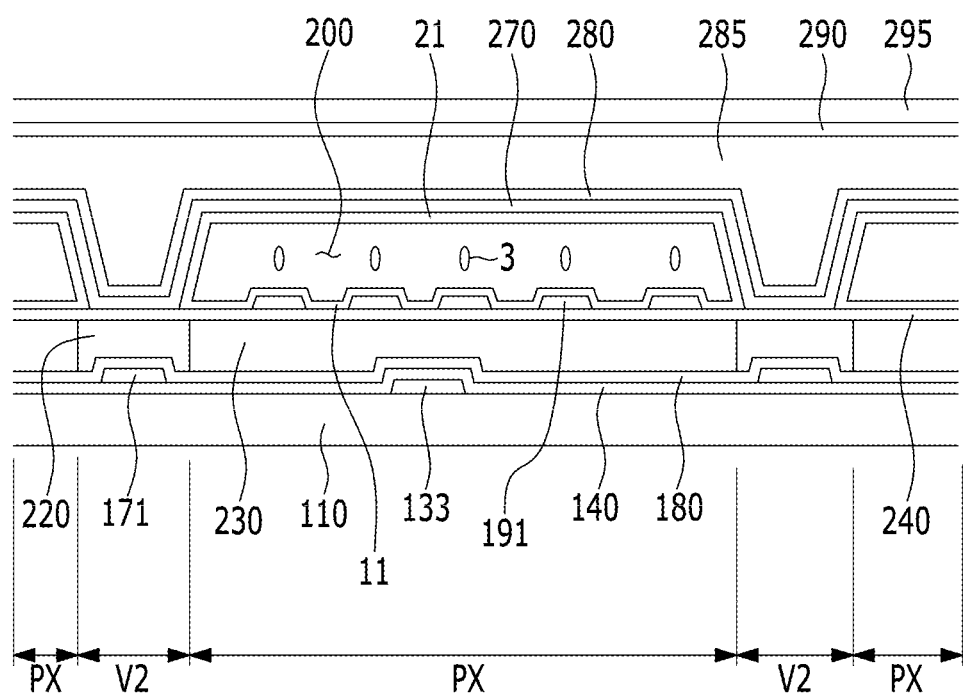
FIG. 4 is a cross-sectional view of a part of a display device according to an exemplary embodiment taken along the line IV-IV of FIG. 2.

FIG. 1 is a top plan view of a display device according to an exemplary embodiment, and FIG. 2 is a top plan view of one pixel of a display device according to an exemplary embodiment. FIG. 3 is a cross-sectional view of a part of a display device according to an exemplary embodiment taken along the line III-III of FIG. 2, and FIG. 4 is a cross-sectional view of a part of a display device according to an exemplary embodiment taken along the line IV-IV of FIG. 2.

A display device according to an exemplary embodiment a substrate 110 made of a material such as glass or plastic.

The substrate 110 includes a plurality of pixel areas PX. The plurality of pixel areas PX are disposed in a matrix including a plurality of pixel rows and a plurality of pixel columns. A first valley V1 is positioned between a plurality of pixel rows, and a second valley V2 is positioned between a plurality of pixel columns.

However, the arrangement shape of the plurality of pixel areas PX is not limited thereto, and variations are possible.

A gate line 121 is formed in one direction and a data line 171 is formed in the other direction on the substrate 110. The gate line 121 may be formed at a first valley V1 and the data line 171 may be formed at a second valley V2. The gate line 121 and the data line 171 may be formed so that they cross. The pixel areas PX of the substrate 110 may be defined by the gate lines 121 and the data lines 171 that are crossed.

The gate line 121 mainly extends in a transverse direction and transmits a gate signal. Also, a gate electrode 124 that protrudes from the gate line 121 is formed, and a gate pad 125 connected to the gate line 121 is formed. The gate pad 125 is connected to an end of the gate line 121. The gate pad 125 may be formed to have a wider width than the gate line 121.

The gate pad 125 receives the gate signal from outside of the display panel and transmits it to the gate line 121, and the gate signal is applied to the gate electrode 124 through the gate line 121.

A storage electrode 133 that is not connected to the gate line 121 or the gate electrode 124 may be further formed in the pixel area PX. As shown, the storage electrode 133 may be formed in directions parallel to both the gate line 121 and the data line 171. Alternatively, the storage electrode 133 may only be formed in the direction parallel to the gate line 121. A plurality of storage electrodes 133 formed in adjacent pixel areas PXs are formed to be connected to each other. The storage electrode 133 is applied with a predetermined voltage, such as a common voltage.

A gate insulating layer 140 is formed on the gate line 121, the gate electrode 124, the gate pad 125, and the storage electrode 133. The gate insulating layer 140 may be made of an inorganic insulating material such as silicon nitride (SiNx) and silicon oxide (SiOx). Also, the gate insulating layer 140 may be formed of a single layer or may include multiple layers.

A semiconductor layer 150 is formed on the gate insulating layer 140. The semiconductor layer 150 may be positioned on the gate electrode 124. Also, as shown, the semiconductor layer 150 may be extended under the data line 171. The semiconductor layer 150 may be made, for example, of amorphous silicon, polycrystalline silicon, or a metal oxide.

A source electrode 173 protruded from the data line 171 and a drain electrode 175 separated from the source electrode 173 are formed on the semiconductor layer 150. Also, a data pad 177 connected to the data line 171 is formed. The data pad 177 is connected to an end of the data line 171. The data pad 177 may be formed to have a wider width than the data line 171.

The data line 171 mainly extends in a longitudinal direction and transmits a data signal. The data pad 177 transmits a data signal applied from outside of the display panel to the data line 171, and the data signal is applied to the source electrode 173 through the data line 171.

The gate electrode 124, the semiconductor layer 150, the source electrode 173, and the drain electrode 175 form one thin film transistor. When the thin film transistor is turned on, the data signal applied to the source electrode 173 is transmitted to the drain electrode 175.

That is, the gate electrode 124 as a portion of the thin film transistor is connected to the gate line 121, and the source electrode 173 as the other portion of the thin film transistor is connected to the data line 171.

A passivation layer 180 is formed on the data line 171, the source electrode 173, the drain electrode 175, the semiconductor layer 150 exposed between the source and drain electrodes 173 and 175, and the data pad 177. The passivation layer 180 may be made, for example, of an organic insulating material or an inorganic insulating material, and may be a single layer or may include multiple layers.

A color filter 230 in each pixel area PX is formed on the passivation layer 180. Each color filter 230 may display, for example, one of a set of primary colors, such as the three primary colors of red, green, and blue. The color filter 230 is not limited to the three primary colors of red, green, and blue, may display cyan, magenta, yellow, and white-based colors.

A light blocking member 220 is formed in a region between the neighboring color filters 230. The light blocking member 220 is formed on a boundary of the pixel area PX and the thin film transistor thereby preventing light leakage. That is, the light blocking member 220 may be formed at the first valley V1 and the second valley V2.

A first insulating layer 240 is formed on the color filter 230 and the light blocking member 220. The first insulating layer 240 may be made, for example, of an inorganic insulating material such as silicon nitride (SiNx) and silicon oxide (SiOx). The first insulating layer 240 has a function of protecting the color filter 230 and the light blocking member 220 made, for example, of the organic material, and may be omitted.

The first insulating layer 240, the light blocking member 220, and the passivation layer 180 have a first contact hole 181 exposing a portion of the drain electrode 175. The first contact hole 181 may be formed in the color filter 230 instead of the light blocking member 220.

On the first insulating layer 240, a pixel electrode 191 connected to the drain electrode 175 through the first contact hole 181 is formed. The pixel electrode 191 is formed in each pixel area PX, and is connected to the drain electrode 175 thereby receiving the data signal from the drain electrode 175 when the thin film transistor is turned on. The pixel electrode 191 may be made, for example, of a transparent metal material such as indium-tin oxide (ITO) and indium-zinc oxide (IZO).

The pixel electrode 191 includes a transverse stem 193, a longitudinal stem 192 crossing the transverse stem 193, and a plurality of first to fourth minute branches 194a, 194b, 194c, and 194d.

The transverse stem 193 may be formed in the direction parallel to the gate line 121, and the longitudinal stem 192 may be formed in the direction parallel to the data line 171. The transverse stem 193 may be formed at about the center between two adjacent gate lines 121, and the longitudinal stem 192 may be formed at about the center between two adjacent data lines 171.

One pixel area PX is divided into a first sub-pixel area, a second sub-pixel area, a third sub-pixel area, and a fourth sub-pixel area by the transverse stem 193 and the longitudinal stem 192. The first sub-pixel area is positioned at the left side of the transverse stem 193 and at the upper side of the longitudinal stem 192, and the second sub-pixel area is positioned at the right side of the transverse stem 193 and at the upper side of the longitudinal stem 192. The third sub-pixel area is positioned at the left side of the transverse stem 193 and at the lower side of the longitudinal stem 192, and the fourth sub-pixel area is positioned at the right side of the transverse stem 193 and at the lower side of the longitudinal stem 192.

The first minute branches 194a are formed in the first sub-pixel area, and the second minute branches 194b are formed in the second sub-pixel area. The third minute branches 194c are formed in the third sub-pixel area, and the fourth minute branches 194d are formed in the fourth sub-pixel area.

The first minute branches 194a obliquely extend in a leftward and upward direction from the transverse stem 193 or the longitudinal stem 192, and the second minute branches 194 obliquely extend in a rightward and upward direction from the transverse stem 193 or the longitudinal stem 192. Also, the third minute branches 194 obliquely extend in a leftward and downward direction from the transverse stem 193 or the longitudinal stem 192, and the fourth minute branches 194 obliquely extend in a rightward and downward direction from the transverse stem 193 or the longitudinal stem 192.

The first to fourth minute branches 194a-194d form an angle of about 45 degrees or 135 degrees with respect to the gate line 121 or the transverse stem 193. Also, the first to fourth minute branches 194a-194d of adjacent sub-pixel areas may be arranged so that they are orthogonal to each other.

The shape of the pixel electrode 191 as shown in FIG. 1 has been described, however the shape of the pixel electrode 191 is not limited thereto and may be variously changed. Also, one pixel area PX is divided into four sub-pixel areas, however one pixel area PX may be divided into more or less than four sub-pixel areas, or one pixel area PX may not be divided into any sub-pixel areas.

A first assistance gate pad 195 and first assistance data pad 197 may be further formed with the same layer as the pixel electrode 191. The first assistance gate pad 195 and the first assistance data pad 197 may be made of the same material as the pixel electrode 191.

The first assistance gate pad 195 may be formed on the gate pad 125. The gate insulating layer 140, the passivation layer 180, and the first insulating layer 240 are formed on the gate pad 125. The gate insulating layer 140, the passivation layer 180, and the first insulating layer 240 have a second contact hole 185 exposing at least a portion of the gate pad 125. The first assistance gate pad 195 is connected to the gate pad 125 through the second contact hole 185. A portion of the first assistance gate pad 195 is formed on the passivation layer 180 and the other portion thereof may be formed directly on the gate pad 125.

A first assistance data pad 197 may be formed on the data pad 177. The gate insulating layer 140, the passivation layer 180, and the first insulating layer 240 are formed on the data pad 177. The gate insulating layer 140, the passivation layer 180, and the first insulating layer 240 have a third contact hole 187 exposing at least a portion of the data pad 177. The first assistance data pad 197 is connected to the data pad 177 through the third contact hole 187. A portion of the first assistance data pad 197 may be formed on the passivation layer 180 and the other portion thereof may be formed directly on the data pad 177.

In general, the gate pad and the data pad receive the signal from outside the display panel such that a portion of an upper surface may be exposed for contact with an outer terminal. At the time of such an exposure, the gate pad and the data pad may be oxidized such that a contact defect may be generated. In the display device according to an exemplary embodiment, the first assistance gate pad 195 and the first assistance data pad 197 made of the metal oxide are formed on the gate pad 125 and the data pad 177, thereby preventing the contact defect.

A common electrode 270 is formed on the pixel electrode 191 in such a way as to be separated from the pixel electrode 191 by a predetermined distance. A microcavity 200 is formed between the pixel electrode 191 and the common electrode 270. A width and an area of the microcavity 200 may be variously changed according to a resolution of the display device.

The common electrode 270 may be made of a transparent metal material such as, for example, indium-zinc oxide (ITO) and indium-zinc oxide (IZO). The common electrode 270 may be applied with a predetermined voltage, and an electric field may be formed between the pixel electrode 191 and the common electrode 270. A third assistance gate pad 275 and a third assistance data pad 277 may be formed with the same layer as the common electrode 270. The third assistance gate pad 275 and the third assistance data pad 277 may be formed with the same material as the common electrode 270.

The third assistance gate pad 275 may be formed on the first assistance gate pad 195. A second assistance gate pad 265 may be formed between the first assistance gate pad 195 and the third assistance gate pad 275.

The third assistance data pad 277 may be formed on the first assistance data pad 197. A second assistance data pad 267 may be formed between the first assistance data pad 197 and the third assistance data pad 277.

The second assistance gate pad 265 and the second assistance data pad 267 are formed of a material having a different etching rate from the common electrode 270. Accordingly, the material used to form the second assistance gate pad 265 and the second assistance data pad 267 also has a different etching rate from the third assistance gate pad 275 and the third assistance data pad 277, which may be formed of the same material as the common electrode 270.

The second assistance gate pad 265 and the second assistance data pad 267 are usefully formed with a material having a faster etching rate than the common electrode 270. For example, the second assistance gate pad 265 and the second assistance data pad 267 may be made of zinc-aluminum oxide (ZAO), gallium-zinc oxide (GZO), or copper.

Usefully, the second assistance gate pad 265 and the second assistance data pad 267 have a thinner thickness than the common electrode 270, and may have, for example, a thickness 50 Å or more.

A liquid crystal 3 is contained in the microcavity 200. The liquid crystal 3 includes a plurality of liquid crystal molecules, and may be aligned in a direction perpendicular to the substrate 110 in the absence of an electric field. That is, vertical alignment may be realized. The alignment is not, however, limited thereto, and horizontal alignment may be realized.

The liquid crystal 3 may be formed, for example, of one of nematic, smectic, cholesteric, and chiral liquid crystal materials. Also, the liquid crystal 3 may be made of a negative liquid crystal material or a positive liquid crystal material.

In the above, the pixel electrode 191 is formed under the microcavity 200, along the bottom side of the microcavity 200 and the common electrode 270 is formed above the microcavity 200, along a top side of the microcavity 200, with respect to the substrate 110. The orientation of the pixel electrode and common electrode is not, however, limited thereto. The pixel electrode 191 and the common electrode 270 may be both formed under the microcavity 200. The pixel electrode 191 and the common electrode 270 may be formed with the same layer or may be formed with different layers via an insulating layer interposed therebetween. The liquid crystal 3 may be formed to be slanted in a direction parallel to the substrate 110 in the microcavity 200.

A first alignment layer 11 is formed on the pixel electrode 191. The first alignment layer 11 may be formed on the first insulating layer 240 that is not covered by the pixel electrode 191.

A second alignment layer 21 facing the first alignment layer 11 is formed under the common electrode 270.

The first alignment layer 11 and the second alignment layer 21 may be vertical alignment layers, and may be made, for example, of a material such as polyamic acid, polysiloxane, and polyimide. As shown in FIG. 4, along the gate line 121 direction, the first and second alignment layers 11 and 21 may be connected at the edge of the pixel area PX. That is, the alignment layers 11 and 21 may line the inside of microcavity 200.

The microcavity 200 is enclosed, along the gate line 121 direction, by the pixel electrode 191 and the common electrode 270 (FIG. 4).

The common electrode 270 is formed to be directly in contact with the first insulating layer 240 in the second valley V2 such that the common electrode 270 may be formed to cover a left side surface and a right side surface (wherein right and left refer to sides of the microcavity facing the left and right side, respectively of the pixel area PX) of the microcavity 200. That is, the common electrode 270 is connected across a plurality of pixel rows, and the height of the common electrode 270 when it is positioned in the second valleys V2 is lower than the height of the common electrode when it is positioned in the pixel area PX. Thus, the microcavity 200 is not formed in the second valley V2, because the height of the common electrode 270 is stepped down in the second valley V2.

Referring to FIG. 3, the common electrode 270 is not formed in at least a partial region of the first valley V1. That is, the common electrode 270 is formed so that it does not cover at least a portion of the upper surface of the microcavity 200 (i.e., the surface facing a top side of the pixel area PX) and the lower surface of the microcavity 200 (i.e., the surface facing the lower side of the pixel area PX, so as to leave a portion of the microcavity 200 exposed to the outside. The exposed portion is referred to as a first injection hole 201. The first injection hole 201 is formed at a position corresponding to the position of first valley V1, and the liquid crystal 3 is injected inside the microcavity 200 through the first injection hole 201.

In the above, the common electrode 270 covers the right surface and the left surface of the microcavity 200 and does not cover at least a portion of the upper surface and the lower surface of the microcavity 200, however the present disclosure is not limited thereto, and the common electrode 270 may cover the other side surface of the microcavity 200. For example, the common electrode 270 may cover the upper surface and the lower surface of the microcavity 200, and may not cover at least a portion of the right surface and the left surface. In which case, the first injection hole 201 may be formed in a position corresponding to the position of the second valley V2.

A second insulating layer 280 may be further formed on the common electrode 270. The second insulating layer 280 may be made, for example, of an inorganic insulating material such as silicon nitride (SiNx) and silicon oxide (SiOx), and may also be omitted as necessary.

A roof layer 285 is formed on the second insulating layer 280. The roof layer 285 may be made, for example, of an organic material. The microcavity 200 is formed under the roof layer 285, and the shape of the microcavity 200 may be maintained by the roof layer 285.

As shown in FIG. 4, the roof layer 285 is connected across the plurality of pixel rows like the common electrode 270. As shown in FIG. 3, the roof layer 285 is removed along the first valley V1 to allow the first injection hole 201 to be formed according to the first valley V1 such that the portion of the microcavity 200 is exposed to the outside.

A third insulating layer 290 may be further formed on the roof layer 285. The third insulating layer 290 may be made, for example, of the inorganic insulating material such as silicon nitride (SiNx) or silicon oxide (SiOx). The third insulating layer 290 may be formed to cover the upper surface and the side surface of the roof layer 285. The third insulating layer 290 has a function of protecting the roof layer 285 made of the organic material, and may be omitted.

An encapsulation layer 295 may be formed on the third insulating layer 290. The encapsulation layer 295 is formed to cover the liquid crystal injection hole 201 where the microcavity 200 is exposed to the outside. That is, the third insulating layer 290 may seal the microcavity 200 so that the liquid crystal 3 formed in the microcavity 200 does not leak out. Because the encapsulation layer 295 contacts the liquid crystal 3, the encapsulation layer 295 may be made of a material which does not react with the liquid crystal 3. For example, the encapsulation layer 295 may be made of parylene.

The encapsulation layer 295 may be formed to include multiple layers, such as a dual layer or a triple layer. The dual layer includes two layers made of different materials. The triple layer includes three layers, and materials of the adjacent layers within the three layer structure are different. For example, the encapsulation layer 295 may include a layer made of the organic insulating material and a layer made of the inorganic insulating material.

The second insulating layer 280, the third insulating layer 290 and the encapsulation layer 295 may be formed so as to not cover at least a portion of the third assistance gate pad 275 and the third assistance data pad 277. The third assistance gate pad 275 and the third assistance data pad 277 may be exposed to contact the outer terminal.

Although not shown, a polarizer may be formed on the upper surface display device. The polarizer includes a first polarizer and a second polarizer. The first polarizer may be attached at the lower surface of the substrate 110 and the second polarizer may be attached on the encapsulation layer 295.

Next, a manufacturing method of a display device according to an exemplary embodiment will be described with reference to FIG. 5 to FIG. 22.

FIG. 5 to FIG. 22 are process cross-sectional views of a manufacturing method of a display device according to an exemplary embodiment. FIG. 5, FIG. 7, FIG. 9, FIG. 11, FIG. 13, FIG. 15, FIG. 17, FIG. 19, and FIG. 21 are the cross-sectional views taken along the same line (corresponding to III-III of FIG. 2). Also, FIG. 6, FIG. 8, FIG. 10, FIG. 12, FIG. 14, FIG. 16, FIG. 18, FIG. 20, and FIG. 22 are the cross-sectional views taken along the same line (corresponding to IV-IV of FIG. 2).

Figure 5:
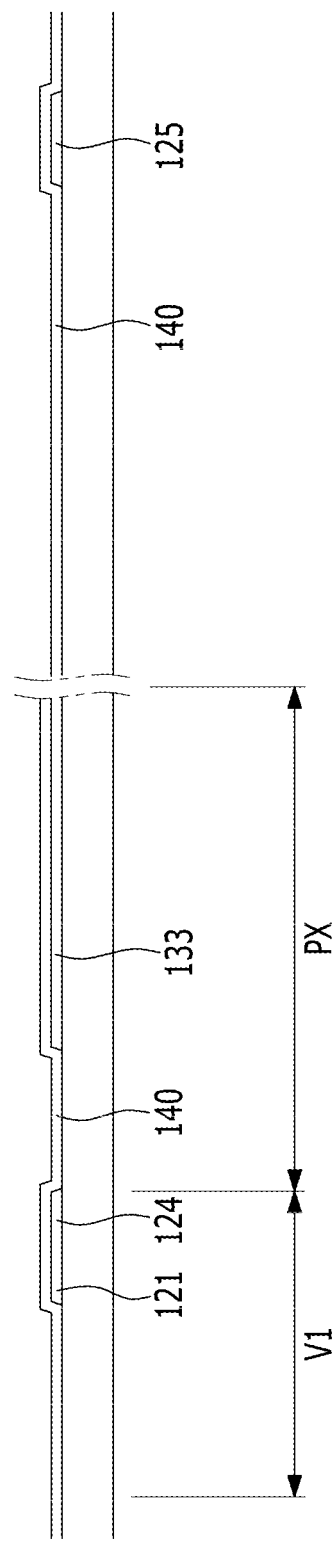
FIG. 5 to FIG. 22 are process cross-sectional views of a manufacturing method of a display device according to an exemplary embodiment.
Figure 6:
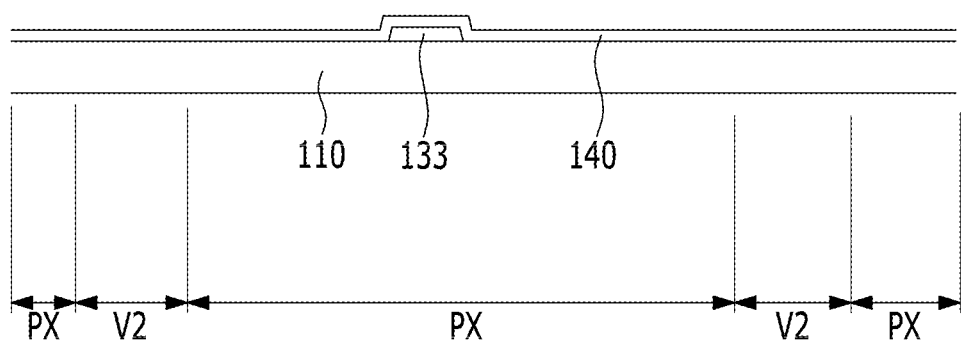

As shown in FIG. 5 and FIG. 6, a gate line 121 extending in one direction and a gate electrode 124 protruded from the gate line 121 are formed on a substrate 110 made, for example, of glass or plastic.

Also, a gate pad 125 connected to the gate line is formed. The gate pad 125 is connected to the gate line. The gate pad 125 may be formed to have a wider width than the gate line. The gate pad 125 is formed with the same material as the gate line and the gate electrode 124 during the same process.

Also, a storage electrode 133, which is separate from the gate line 121 and the gate electrode 124, is formed. The storage electrode 133 may be formed with the same material as the gate line 121 and the gate electrode 124.

A gate insulating layer 140 made, for example, of an inorganic insulating material such as silicon oxide or silicon nitride is formed on an entire surface of the substrate 110 including the gate line 121, the gate electrode 124, and the storage electrode 133. The gate insulating layer 140 may be formed with a single layer or a multilayer.

Figure 7:
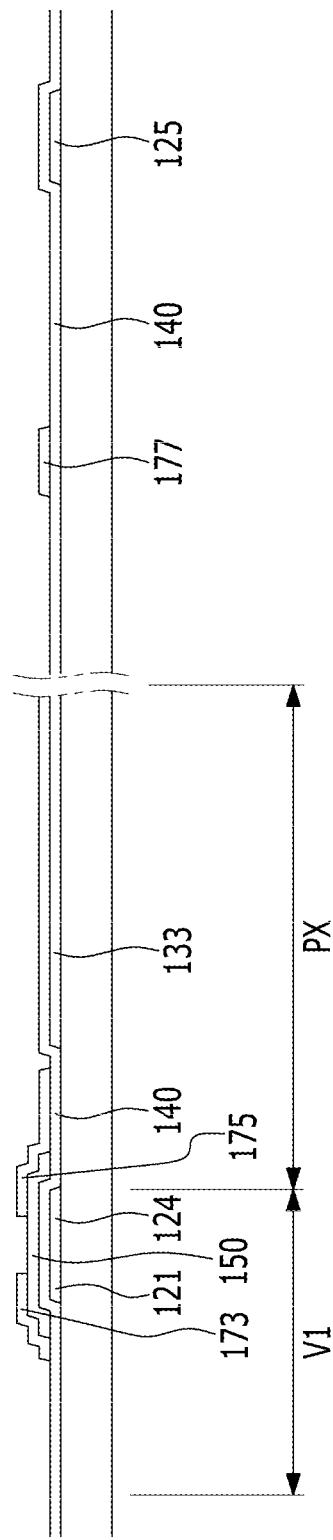
Figure 8:
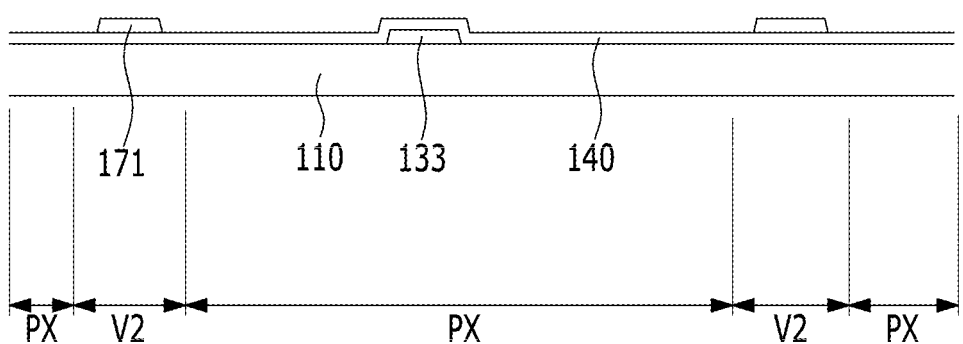

As shown in FIG. 7 and FIG. 8, a semiconductor material such as, for example, amorphous silicon, polycrystalline silicon, and a metal oxide is deposited on the gate insulating layer 140 and patterned to form a semiconductor layer 150.

The semiconductor layer 150 may be formed to be positioned on the gate electrode 124.

A metal material is deposited and patterned to form a data line 171 extending in the other direction from the gate line 121. Also, a source electrode 173 protruded from the data line 171 on the semiconductor layer 150 and a drain electrode 175 separated from the source electrode 173 are formed. The metal material may be made of a single layer or a multiple layers.

A data pad 177 connected to the data line 171 is formed. The data pad 177 may be formed to have a wider width than the data line 171. The data pad 177 is formed with the same material as the data line 171, the source electrode 173, and the drain electrode 175.

The semiconductor material and the metal material may be continuously deposited and simultaneously patterned to form the semiconductor layer 150, the data line 171, the source electrode 173, and the drain electrode 175. The semiconductor layer 150 is extended under the data line 171.

The gate electrode 124, the semiconductor layer 150, the source electrode 173, and the drain electrode 175 form one thin film transistor. The gate line 121 and the data line 171 may be formed so as to be cross each other, and a plurality of pixel areas PX may be defined by the gate lines 121 and the data lines 171.

Figure 9:
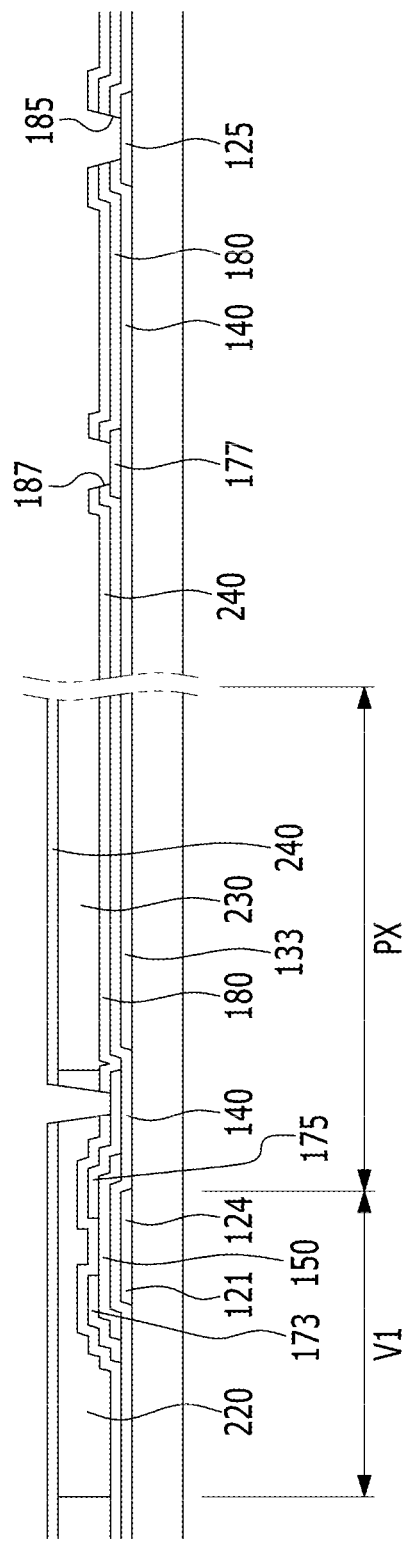
Figure 10:
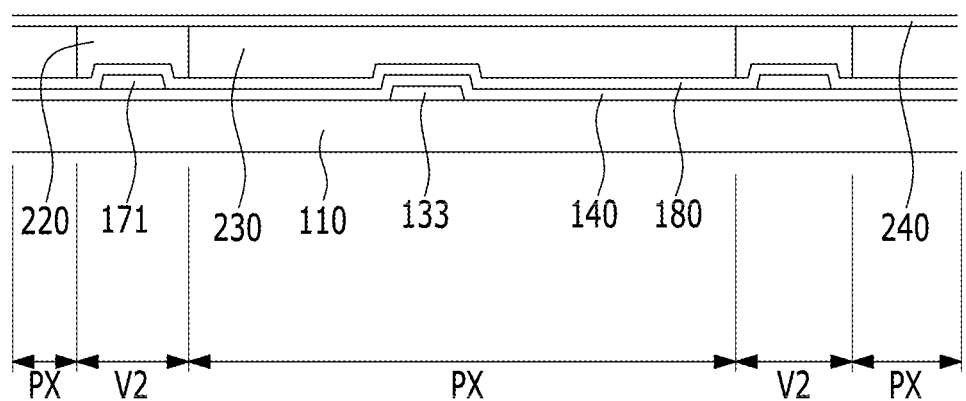

As shown in FIG. 9 and FIG. 10, a passivation layer 180 is formed on the data line 171, the source electrode 173, the drain electrode 175, and the semiconductor layer 150 exposed between the source electrode 173 and the drain electrode 173.

The passivation layer 180 may be made, for example, of the organic insulating material or the inorganic insulating material, and may be formed of a single layer or a multilayer.

A color filter 230 is formed in each pixel area PX on the passivation layer 180. Color filters 230 of the same color may be formed according to the column direction of a plurality of pixel areas PX. For example, when forming the color filters 230 of three colors, the color filter 230 of the first color are formed and then the color filter 230 of the second color is formed by shifting a mask. Next, after forming the color filter 230 of the second color, the color filter 230 of the third color may be formed by shifting the mask again.

A light blocking member 220 is formed on the thin film transistor and the boundary of each pixel area PX on the passivation layer 180.

After forming the color filter 230, the light blocking member 220 is formed, however the present disclosure is not limited thereto, and the color filter 230 may be formed after forming the light blocking member 220.

The first insulating layer 240 made of the inorganic insulating material such as silicon nitride (SiNx) and silicon oxide (SiOx) is formed on the color filter 230 and the light blocking member 220.

The first insulating layer 240, the light blocking member 220, and the passivation layer 180 are then etched to form a contact hole 181 exposing a portion of the drain electrode 175.

The gate insulating layer 140, the passivation layer 180, and the first insulating layer 240 are formed on the gate pad 125, and in the process of forming the first contact hole 181, the gate insulating layer 140, the passivation layer 180, and the first insulating layer 240 are etched to expose at least a portion of the gate pad 125 thereby forming the second contact hole 185.

The passivation layer 180 and the first insulating layer 240 are formed on the data pad 177, and in the process of forming the first contact hole 181, the passivation layer 180 and the first insulating layer 240 are etched to expose at least a portion of the data pad 177 thereby forming the third contact hole 187.

Figure 11:
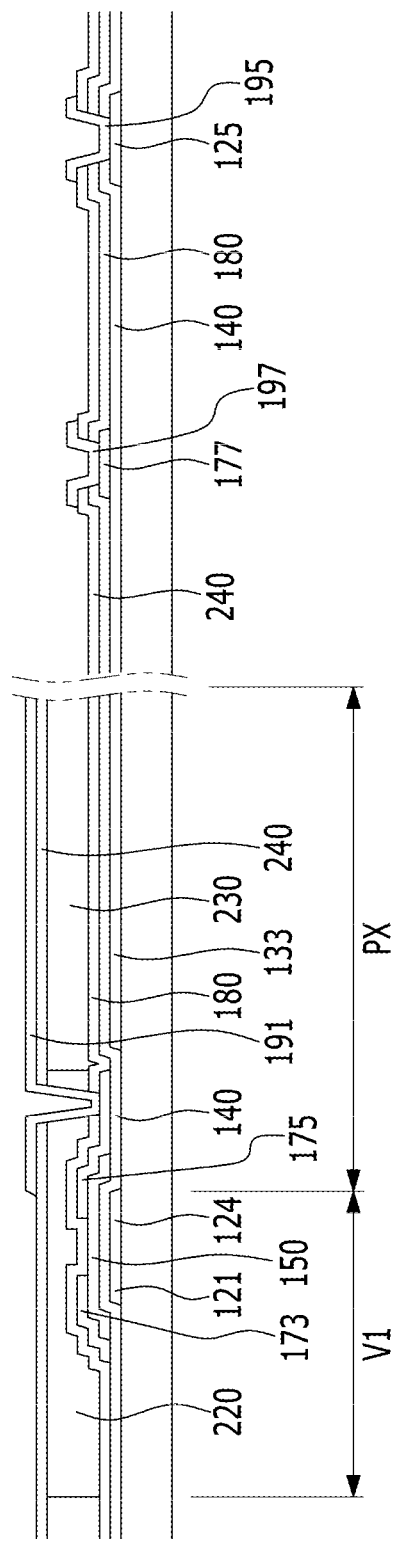
Figure 12:
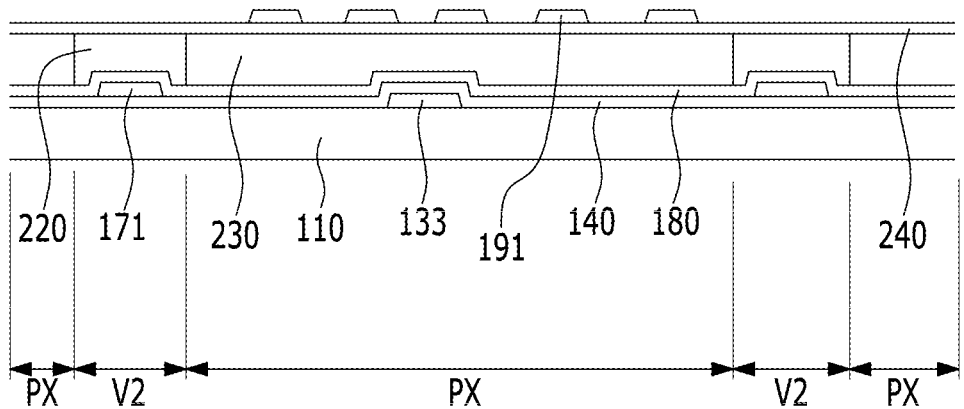

As shown in FIG. 11 and FIG. 12, a transparent metal material such as indium-tin oxide (ITO) and indium-zinc oxide (IZO) is deposited and patterned on the first insulating layer 240 to form a pixel electrode 191 in the pixel area PX. The pixel electrode 191 is connected to the drain electrode 175 through the contact hole 181.

In the process of forming the pixel electrode 191, the first assistance gate pad 195 may be formed on the gate pad 125 and the first assistance data pad 197 may be formed on the data pad 177. The first assistance gate pad 195 is connected to the gate pad 125 through the second contact hole 185, and the first assistance data pad 197 is connected to the data pad 177 through the third contact hole 187. The first assistance gate pad 195 and the first assistance data pad 197 may be made of the same material as the pixel electrode 191.

Figure 13:
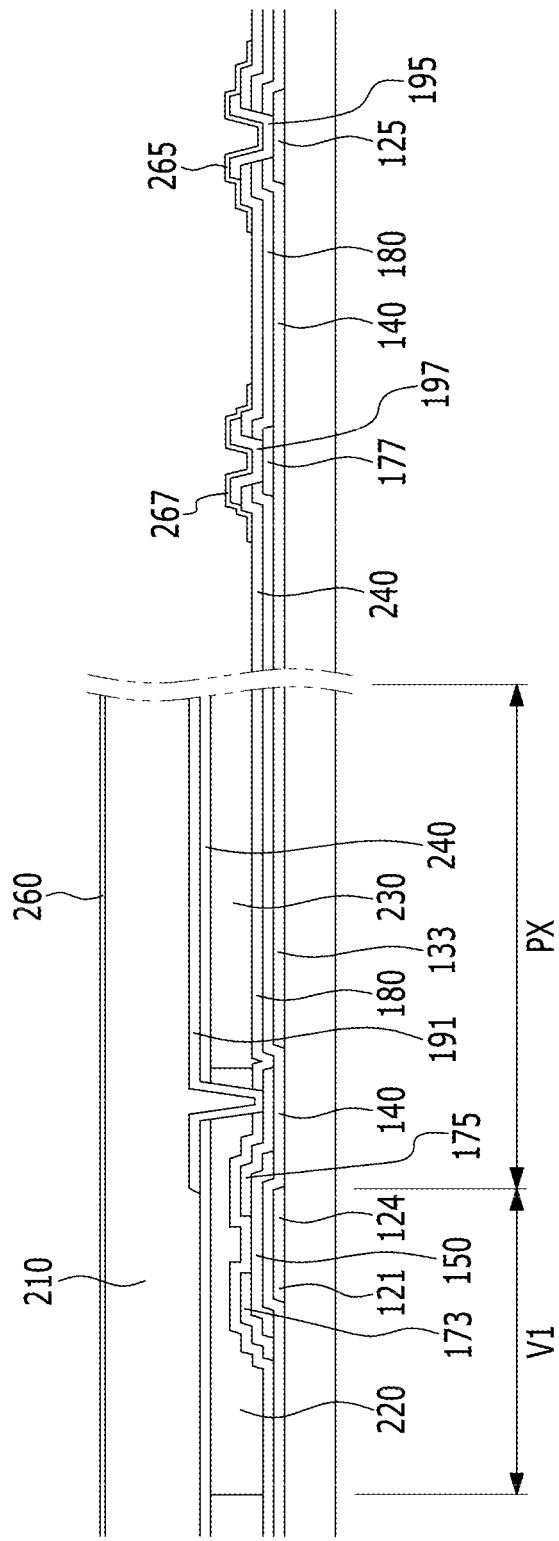
Figure 14:
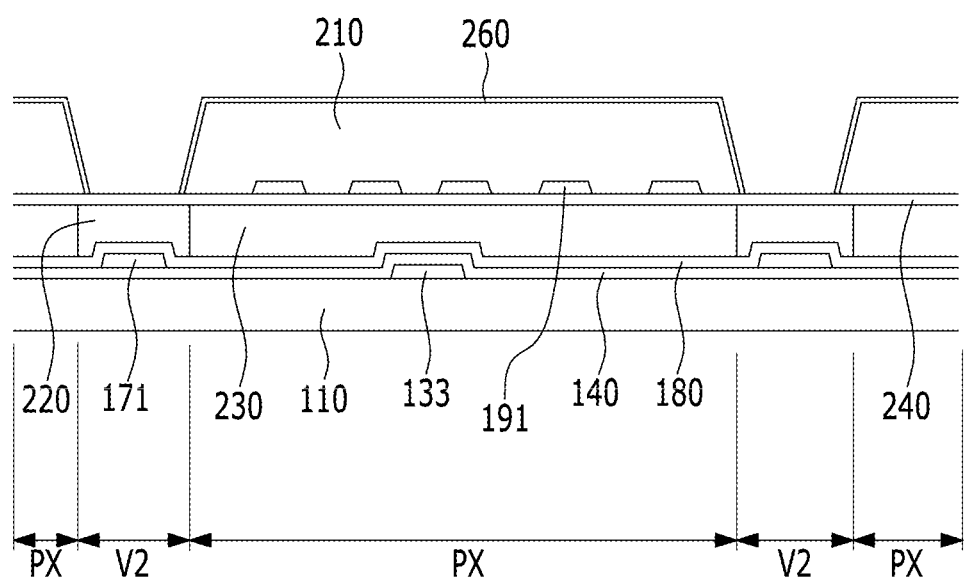

As shown in FIG. 13 and FIG. 14, a photosensitive organic material is coated on the pixel electrode 191 and patterned through a photo-process to form a sacrificial layer 210. The sacrificial layer 210 is formed to be connected across a plurality of pixel columns. That is, the sacrificial layer 210 is formed to cover the first valley V1 positioned between the adjacent pixel areas PX.

The sacrificial layer 210 is patterned to be removed from (not remain on) the first assistance gate pad 195 and the first assistance data pad 197.

A metal material such as zinc-aluminum oxide (ZAO), gallium-zinc oxide (GZO), or copper is deposited and patterned on the sacrificial layer 210 to form a barrier layer 260.

In the process of forming the barrier layer 260, the second assistance gate pad 265 may be formed on the first assistance gate pad 195, and the second assistance data pad 267 may be formed on the first assistance data pad 197. The second assistance gate pad 265 and the second assistance data pad 267 may be made of the same material as the barrier layer 260.

The barrier layer 260 may be formed by using a mask used for patterning the sacrificial layer 210. Accordingly, the sacrificial layer 210 may be formed with substantially the same pattern as the barrier layer 260. In this case, a photosensitive organic material is coated and the metal material is deposited and they are simultaneously patterned to form the sacrificial layer 210 and the barrier layer 260.

However, when simultaneously patterning the barrier layer 260 and the sacrificial layer 210, the second assistance gate pad 265 and the second assistance data pad 267 may not be formed.

Figure 15:
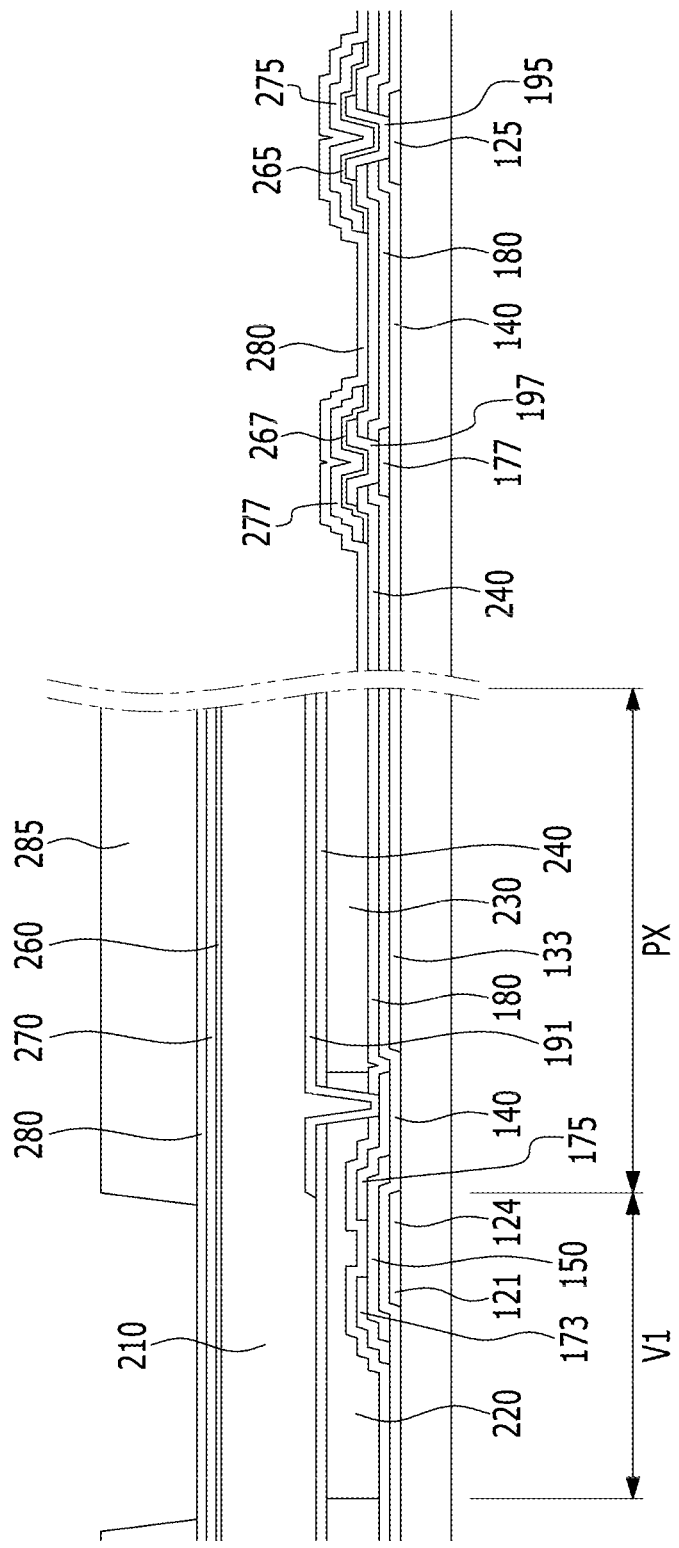
Figure 16:
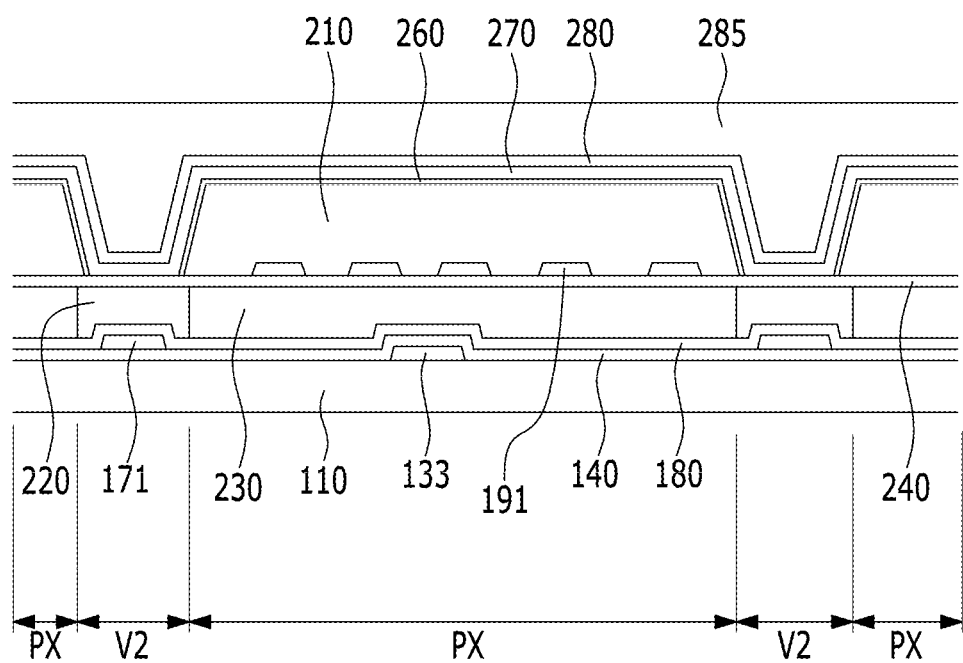

As shown in FIG. 15 and FIG. 16, the transparent metal material such as ITO and IZO is deposited on the barrier layer 260 and patterned to form a common electrode 270.

In the process of forming the common electrode 270, the third assistance gate pad 275 may be formed on the second assistance gate pad 265 and the third assistance data pad 277 may be formed on the second assistance data pad 267. The third assistance gate pad 275 and the third assistance data pad 277 may be made of the same material as the common electrode 270.

The third assistance gate pad 275, the third assistance data pad 277, and the second insulating layer 280 made of the inorganic insulating material such as, for example, silicon oxide or silicon nitride may be formed on the common electrode 270.

An organic material is then formed on the second insulating layer 280 to form the roof layer 285. The roof layer 285 may be patterned to remove the roof layer 285 positioned at the first valley V1.

Figure 17:
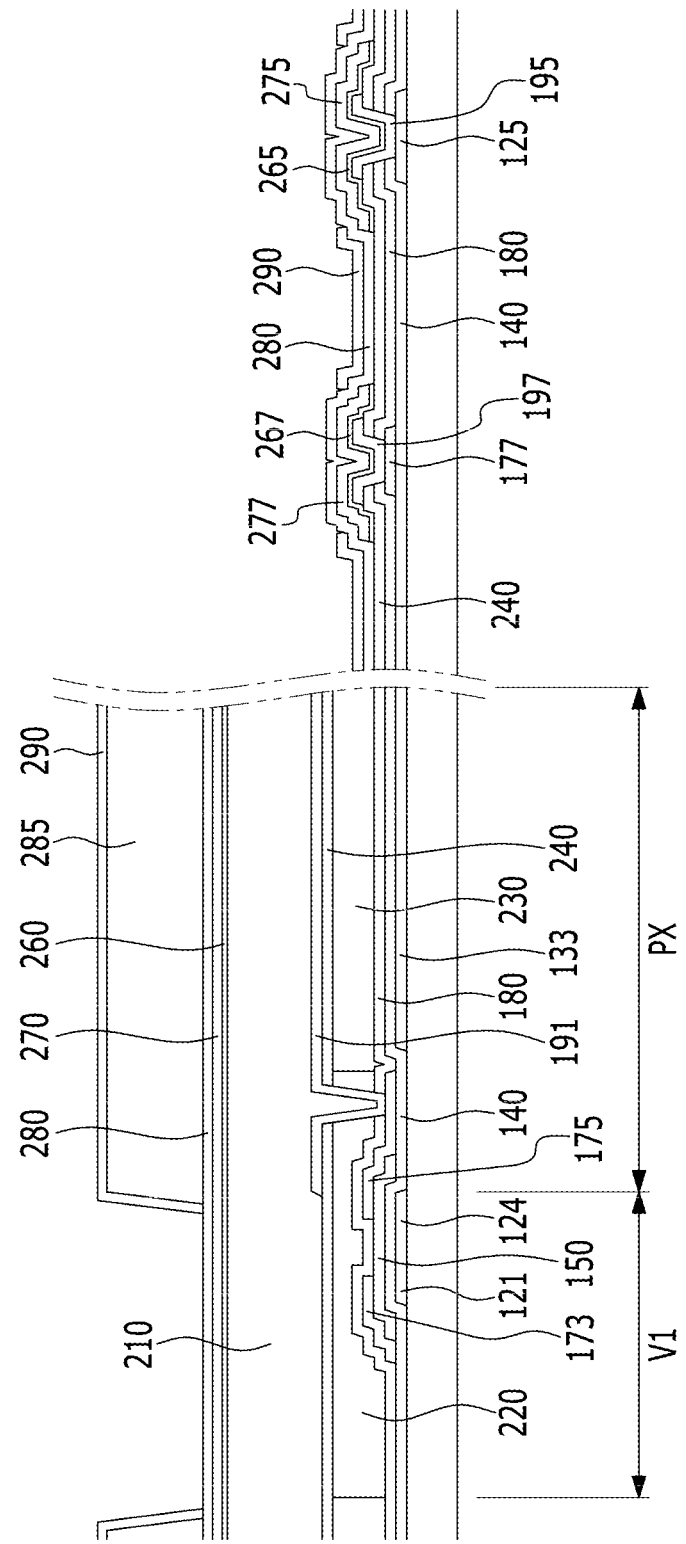
Figure 18:
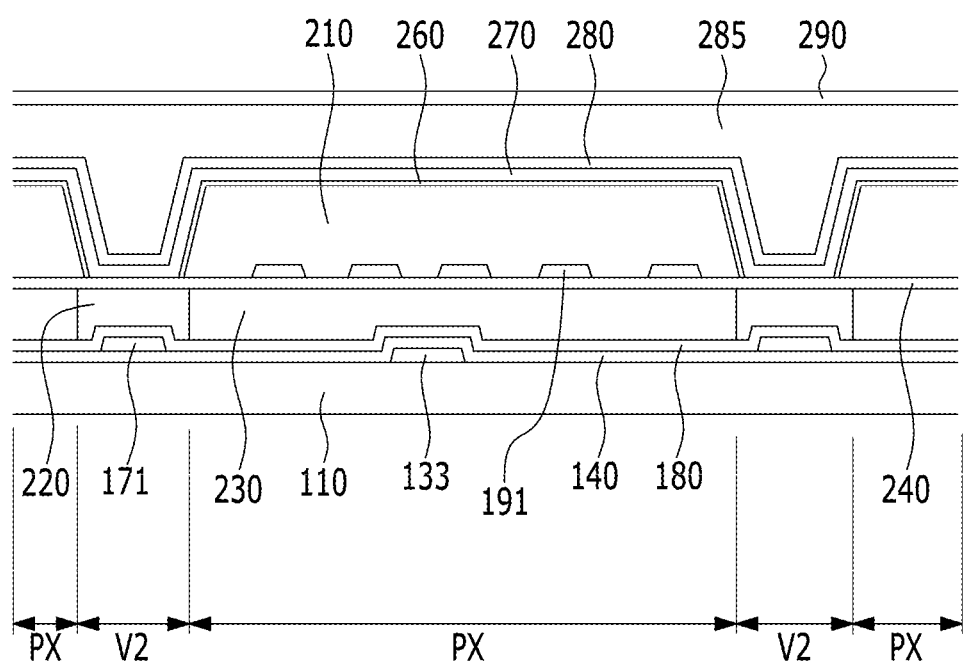

As shown in FIG. 17 and FIG. 18, the third insulating layer 290 made of the inorganic insulating material such as, for example, silicon nitride (SiNx) and silicon oxide (SiOx) is formed on the roof layer 285. The third insulating layer 290 is formed on the patterned roof layer 285 thereby covering and protecting the side surface of the roof layer 285.

Figure 19:
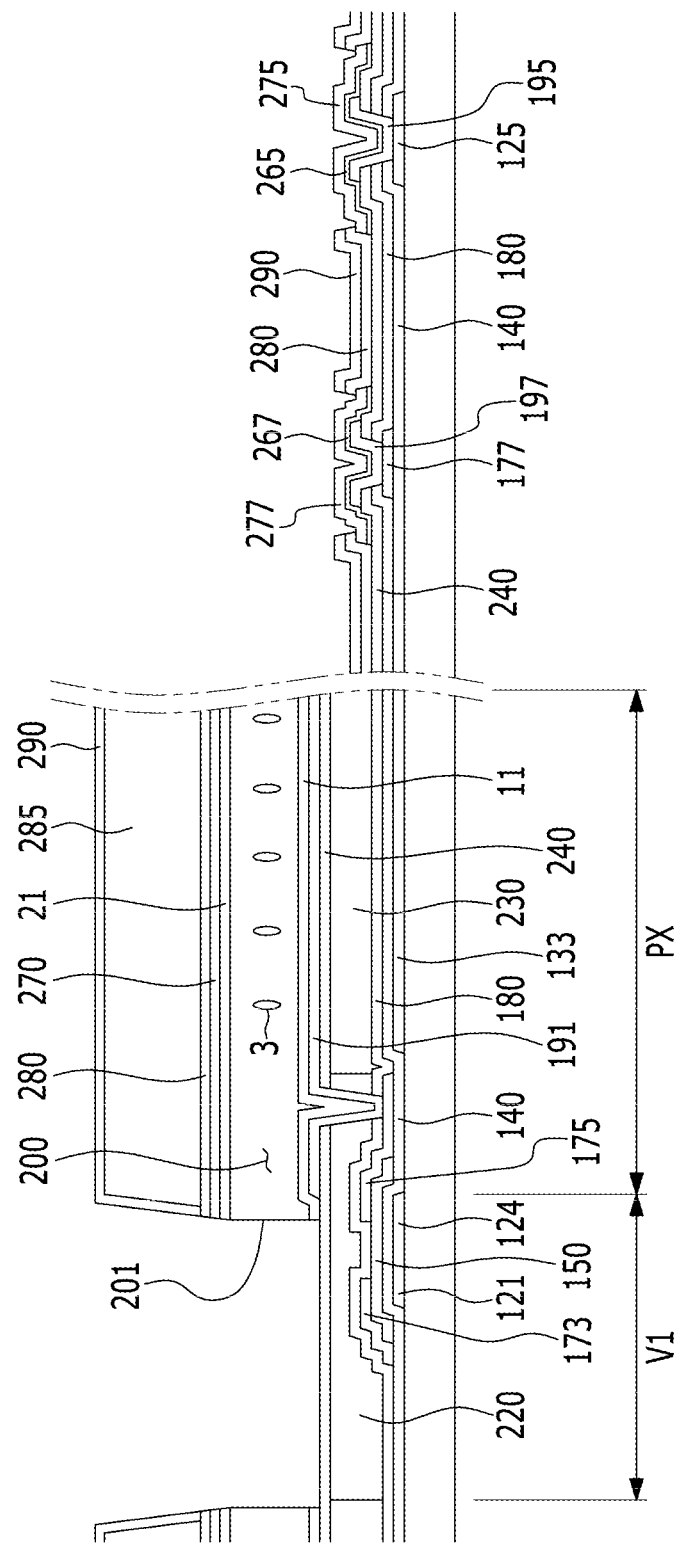
Figure 20:
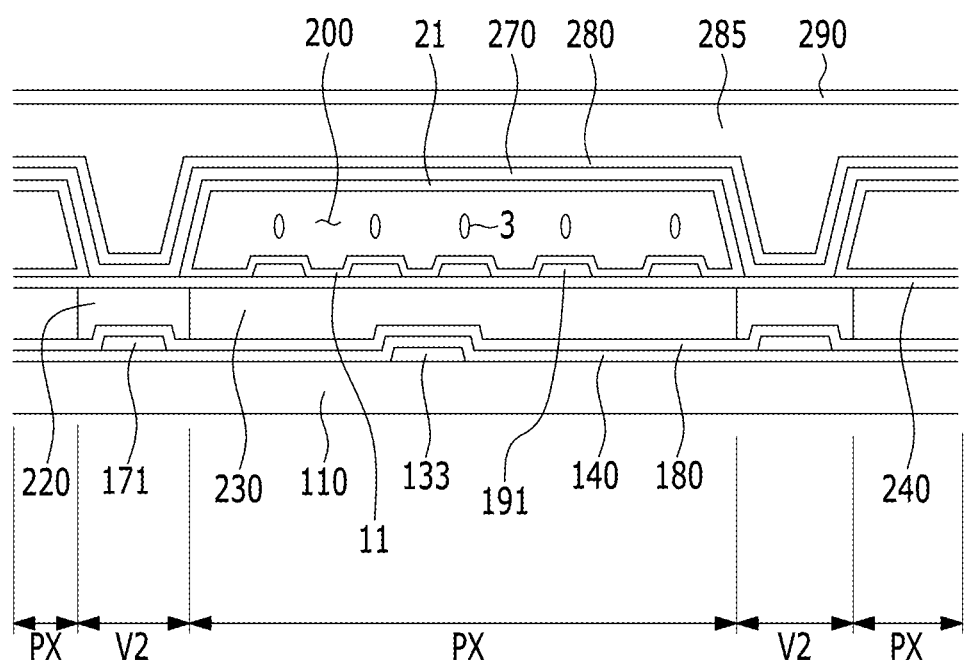

As shown in FIG. 19 and FIG. 20, the third insulating layer 290, the second insulating layer 280, the common electrode 270, and the barrier layer 260 are patterned to remove the portions of the third insulating layer 290, the second insulating layer 280, common electrode 270 and the barrier layer 260 that are positioned at the first valley V1.

Accordingly, the sacrificial layer 210 positioned under the portion where the common electrode 270 is removed is exposed.

A developer is supplied on the substrate 110 where the sacrificial layer 210 is exposed to entirely remove the sacrificial layer 210. When the sacrificial layer 210 is removed, the microcavity 200 is generated at the position where the sacrificial layer 210 was positioned. A microcavity 200 is formed for each pixel area PX.

The pixel electrode 191 and the common electrode 270 are separated from each other via the microcavity 200, and the pixel electrode 191 and the roof layer 285 are separated from each other via the microcavity 200. The common electrode 270 and the roof layer 285 are formed to cover the upper surface and both side surfaces of the microcavity 200.

The microcavity 200 is exposed outside (i.e., open) through the portion where the roof layer 285 and the common electrode 270 are not formed, which is referred to as the injection hole 201. The injection hole 201 is formed in a position facing the position of the first valley V1. Alternatively, the injection hole 201 may be formed in a position facing the position of the second valley V2.

An etchant is supplied to the substrate 110 with the sacrificial layer 210 removed to remove the barrier layer 260. The etchant is injected in the microcavity 200 though the injection hole 201 thereby removing the barrier layer 260 covering the upper surface of the microcavity 200.

After forming the sacrificial layer 210, as a plurality of processes are additionally performed, a property of the sacrificial layer 210 is changed thereby generating a spoilage layer. The spoilage layer may not be removed in the process of removing the sacrificial layer 210 and may remain as a bottom surface of the barrier layer 260. In the process of removing the barrier layer 260, the spoilage layer may also be removed.

The barrier layer 260 may be formed of the material having a different etching rate from the common electrode 270. Usefully, the barrier layer 260 is made of the material having the faster etching rate than the common electrode 270. The second assistance gate pad 265 and the second assistance data pad 267 are formed with the same material as the barrier layer 260 such that they are formed of the material having the faster etching rate than the common electrode 270.

The common electrode 270 is formed directly on the barrier layer 260, and ZAO and GZO may be etched with the same etchant as IZO. Accordingly, when the etchant is supplied for a long time, the common electrode 270 may be damaged. However, ZAO and GZO have the faster etching rate than IZO such that the damage to the common electrode 270 while the barrier layer 260 is removed may be prevented.

Usefully, the barrier layer 260 has a thinner thickness than the common electrode 270 to allow for easy removal. Also, when the barrier layer 260 is very thin, the spoilage layer may not normally be removed when removing the barrier layer 260. Usefully, the thickness of the barrier layer 260 is 50 Å or more.

Heat is applied to the substrate 110 to harden the roof layer 285. This is so the shape of the microcavity 200 can be maintained by the roof layer 285.

If an aligning agent including an organic aligning material is dripped on the substrate 110 by a spin coating method or an inkjet method, the aligning agent is injected into the microcavity 200 through the injection hole 201. If a hardening process is performed after injecting the aligning agent into the microcavity 200, a solvent component is evaporated, and the aligning material remains at the wall surface in the microcavity 200.

Accordingly, the first alignment layer 11 may be formed on the pixel electrode 191 and the second alignment layer 21 may be formed under the roof layer 285. The first alignment layer 11 and the second alignment layer 21 are formed to face each other with the microcavity 200 interposed therebetween, and to be connected to each other at the edge of the pixel area. The common electrode 270 forms a side wall covering the side surface of the microcavity 200 in the direction parallel to the data line 171 in the portion adjacent to the data line 171, and the aligning material remains on the inner surface of the side wall.

The first and second alignment layers 11 and 21 may form the alignment in the direction perpendicular to the first substrate 110 except at the side surface of the microcavity 200. In additional, UV is irradiated to the first and second alignment layers 11 and 21 such that alignment in the direction parallel to the substrate 110 may be achieved.

If the liquid crystal 3 including the liquid crystal molecules is dripped on the substrate 110 by the inkjet method or a dispensing method, the liquid crystal 3 is injected into the microcavity 200 through the injection hole 201. In this case, the liquid crystal 3 may be dripped to injection holes 201 formed facing odd-numbered first valleys V1, and may not be dripped to the injection holes 201 formed facing even-numbered first valleys V1. As an alternative, the liquid crystal 3 may be dripped to injection holes 201 formed facing the even-numbered first valleys V1 and may not be dripped to the injection holes 201 formed facing the odd-numbered first valleys V1.

If the liquid crystal 3 is dripped to the injection holes 201 formed facing the odd-numbered the first valleys V1, the liquid crystal 3 is injected into the microcavity 200 through the injection holes 201 by capillary force. In this case, air in the microcavity 200 is exhausted through the injection holes 201 formed facing the even-numbered first valleys V1 such that the liquid crystal 3 is easily injected into the microcavity 200.

Also, the liquid crystal 3 may be dripped to all injection holes 201. That is, the liquid crystal 3 may be dripped to the injection holes 201 formed facing the odd-numbered first valleys V1 and the injection holes 201 formed facing the even-numbered first valleys V1.

Figure 21:
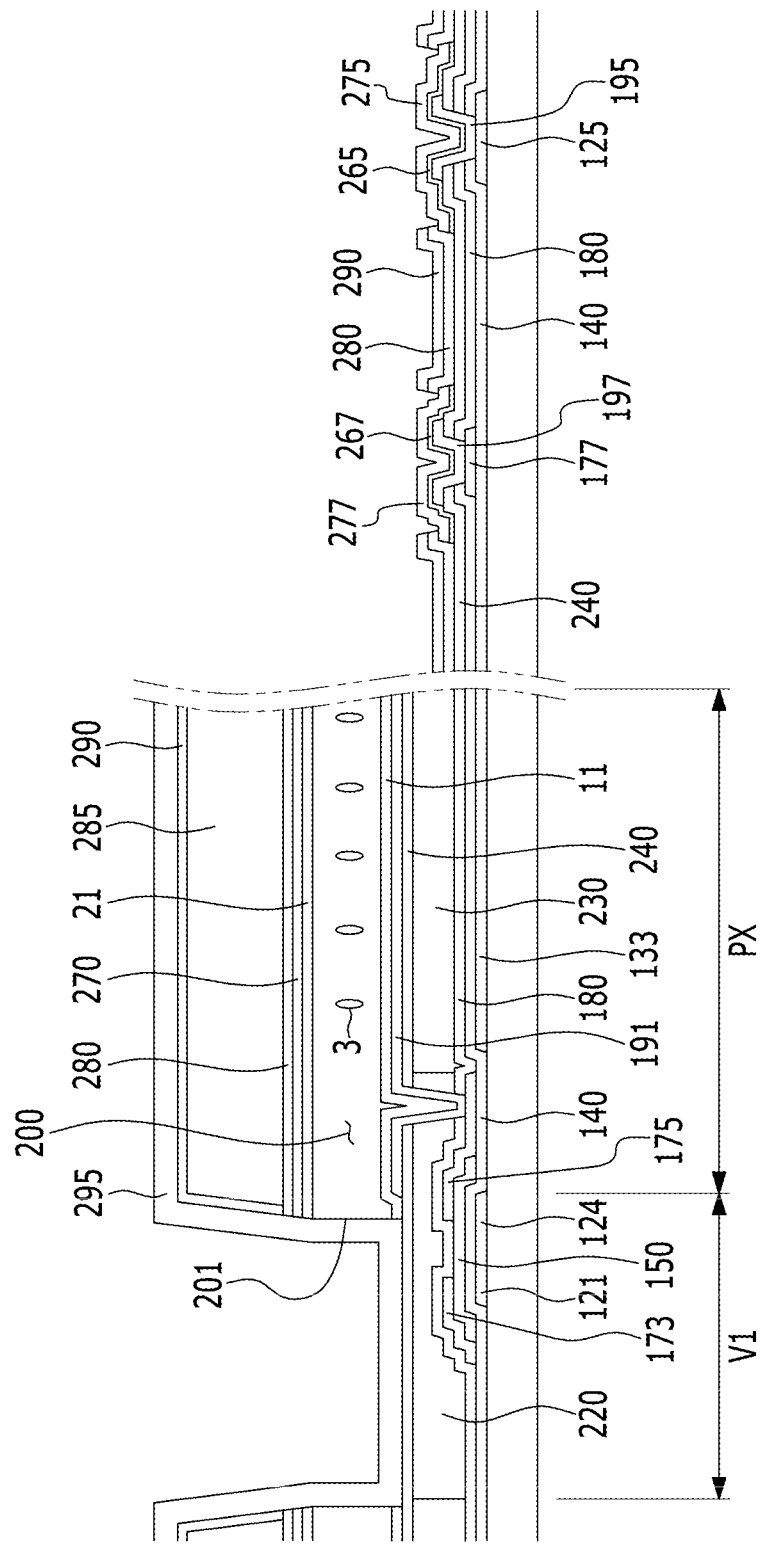
Figure 22:
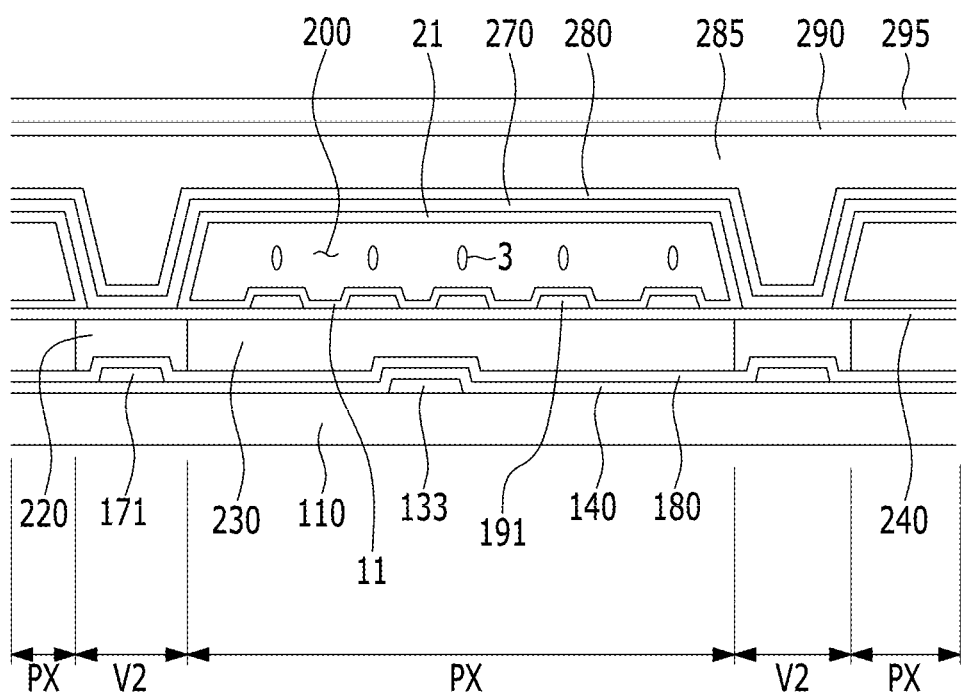

As shown in FIG. 21 and FIG. 22, a material that does not react with liquid crystal 3 is deposited on the third insulating layer 290 to form the encapsulation layer 295. The encapsulation layer 295 is formed to cover the injection hole 201 exposing the microcavity 200, thereby sealing the microcavity 200.

The encapsulation layer 295 is not formed on at least a portion of the third assistance gate pad 195 and the third assistance data pad 197. Also, the second insulating layer 280 and the third insulating layer 290 are formed so as to not cover at least a portion of the third assistance gate pad 195 and the third assistance data pad 197. The third assistance gate pad 195 and the third assistance data pad 197 are exposed to the outside, thereby realizing contact with the outer terminal.

Although not shown, a polarizer may be attached on upper and lower surfaces of the display device. The polarizer may include the first polarizer and the second polarizer. The first polarizer may be attached at the lower surface of the substrate 110, and the second polarizer may be attached on the encapsulation layer 295.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure, including the appended claims.

<Description of Symbols>

| | |
|---|---|
| 3: liquid crystal | 11: first alignment layer |
| 21: second alignment layer | 110: substrate |
| 121: gate line | 124: gate electrode |
| 125: gate pad | 133: storage electrode |
| 140: gate insulating layer | 150: semiconductor layer |
| 171: data line | 173: source electrode |
| 175: drain electrode | 177: data pad |
| 180: passivation layer | 181: first contact hole |
| 185: second contact hole | 187: third contact hole |
| 191: pixel electrode | 192: longitudinal stem |

-continued

<Description of Symbols>

| | |
|---|---|
| 193: transverse stem | 195: first assistance gate pad |
| 197: first assistance data pad | 200: microcavity |
| 201: injection hole | 210: sacrificial layer |
| 220: light blocking member | 230: color filter |
| 240: first insulating layer | 260: barrier layer |
| 265: second assistance gate pad | 267: second assistance data pad |
| 270: common electrode | 275: third assistance gate pad |
| 277: third assistance data pad | 280: second insulating layer |
| 285: roof layer | 290: third insulating layer |
| 295: encapsulation layer | |

What is claimed is:

1. A method of manufacturing a display device, comprising:
   forming a thin film transistor on a substrate including a plurality of pixel areas;
   forming a pixel electrode connected to the thin film transistor in the pixel area;
   forming a sacrificial layer on the pixel electrode;
   forming a barrier layer on the sacrificial layer;
   forming a common electrode on the barrier layer;
   forming a roof layer on the common electrode;
   patterning the barrier layer, the common electrode, and the roof layer to expose a portion of the sacrificial layer, thereby forming an injection hole;
   removing the sacrificial layer to form a microcavity for a plurality of pixel areas;
   removing the barrier layer;
   injecting a liquid crystal into the microcavity through the injection hole; and
   forming an encapsulation layer on the roof layer to seal the microcavity, wherein the barrier layer is made of metal or metal oxide having a different etching rate from the common electrode.

2. The method of claim 1, wherein
   the barrier layer is made of a material having a different etching rate from the common electrode.

3. The method of claim 1, wherein
   the barrier layer is made of one of zinc-aluminum oxide (ZAO), gallium-zinc oxide (GZO), and copper.

4. The method of claim 3, wherein
   the common electrode is made of indium-zinc oxide (IZO).

5. The method of claim 1, wherein
   the barrier layer is formed with a thinner thickness than the common electrode.

6. The method of claim 5, wherein
   the thickness of the barrier layer is 50 Å or more.

7. The method of claim 1, wherein
   the sacrificial layer is made of a photosensitive organic material, and
   removing the sacrificial layer includes supplying a developer through the injection hole to remove the sacrificial layer.

8. The method of claim 7, wherein removing the barrier layer includes supplying an etchant through the injection hole to remove the barrier layer.

9. The method of claim 1, wherein
   the sacrificial layer is formed with the same pattern as the barrier layer.

10. The method of claim 1, further comprising:
    forming a gate line and a gate pad connected to the gate line on the substrate;
    forming a gate insulating layer on the gate line and the gate pad;
    forming a data line and a data pad connected to the data line on the gate insulating layer; and
    forming a passivation layer on the data line and the data pad,
    wherein a portion of the thin film transistor is connected to the gate line and another portion of the thin film transistor is connected to the data line.

11. The method of claim 10, further comprising
    patterning the passivation layer and the gate insulating layer to remove at least a portion of the gate insulating layer and the passivation layer positioned on the gate pad and at least a portion of the passivation layer positioned on the data pad,
    wherein forming the pixel electrode includes,
    forming a first assistance gate pad on the gate pad and forming a first assistance data pad on the data pad, and
    forming the first assistance gate pad and the second assistance data pad with the same material as the pixel electrode.

12. The method of claim 11, further comprising
    patterning the sacrificial layer to remove a portion of the sacrificial layer positioned on the first assistance gate pad and the first assistance data pad,
    wherein forming the barrier layer includes forming a second assistance gate pad on the first assistance gate pad and forming a second assistance data pad on the first assistance data pad, and
    forming the second assistance gate pad and the second assistance data pad with the same material as the barrier layer.

13. The method of claim 12, wherein
    forming the common electrode includes forming a third assistance gate pad on the second assistance gate pad and a third assistance data pad is formed on the second assistance data pad, and
    forming the third assistance gate pad and the third assistance data pad with the same material as the common electrode.

* * * * *